United States Patent
Nicolosi et al.

(10) Patent No.: US 11,881,779 B2
(45) Date of Patent: Jan. 23, 2024

(54) ADAPTIVE COMPENSATION SYTEM FOR SWITCHING POWER CONVERTERS

(71) Applicant: STMicroelectronics S.r.l., Agrate Brianza (IT)

(72) Inventors: Alessandro Nicolosi, Dresano (IT); Valeria Bottarel, Novara (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 135 days.

(21) Appl. No.: 17/533,042

(22) Filed: Nov. 22, 2021

(65) Prior Publication Data

US 2022/0190721 A1 Jun. 16, 2022

(30) Foreign Application Priority Data

Nov. 24, 2020 (IT) .................. 102020000028208

(51) Int. Cl.
*H02M 3/158* (2006.01)
*H02M 1/00* (2006.01)

(52) U.S. Cl.
CPC .......... *H02M 3/158* (2013.01); *H02M 1/0009* (2021.05)

(58) Field of Classification Search
CPC .... H02M 3/156; H02M 3/158; H02M 3/1588; H02M 3/155; H02M 3/1582; H02M 3/157; H02M 3/1563; H02M 3/1584; H02M 1/32; H02M 1/081–084; H02M 1/0006; H02M 2003/1566; H02M 2003/1557; H02M 2001/0012; H02M 2001/0009; H02M 2001/385; H04B 2215/069

See application file for complete search history.

(56) References Cited

U.S. PATENT DOCUMENTS

| | | | |
|---|---|---|---|
| 6,583,609 B1 | 6/2003 | Pardoen | |
| 2013/0249505 A1 | 9/2013 | Brown et al. | |
| 2014/0084888 A1* | 3/2014 | Kim | H02M 3/157 323/283 |
| 2015/0084607 A1 | 3/2015 | Hayami et al. | |
| 2020/0195161 A1* | 6/2020 | Mayell | H02M 3/33592 |
| 2020/0236761 A1 | 7/2020 | Shi et al. | |

FOREIGN PATENT DOCUMENTS

| | | |
|---|---|---|
| EP | 1560412 A1 | 8/2005 |
| EP | 2953248 A1 | 12/2015 |

* cited by examiner

*Primary Examiner* — Bryan R Perez
(74) *Attorney, Agent, or Firm* — Slater Matsil, LLP (57) ABSTRACT

In an embodiment a DC-DC switching power converter includes a switching circuitry including switches, the switching circuitry configured to receive a DC input voltage and generate a DC output voltage via switching the switches, a switching control circuitry configured to control switching of the switches with a switching signal having a corresponding switching frequency with a corresponding duty cycle, the DC output voltage generated by the switching circuitry depending on the duty cycle, wherein the switching control circuitry is configured to set the duty cycle based on a difference between the DC output voltage and a reference voltage in a closed loop configuration and a compensation network configured to provide stability to an operation of the DC-DC switching power converter, wherein the compensation network has a capacitance having a value depending on the switching frequency.

21 Claims, 5 Drawing Sheets

ADAPTIVE COMPENSATION SYTEM FOR SWITCHING POWER CONVERTERS

CROSS-REFERENCE TO RELATED APPLICATIONS

This application claims the benefit of Italian Application No. 102020000028208, filed on Nov. 24, 2020, which application is hereby incorporated herein by reference.

TECHNICAL FIELD

The present disclosure generally relates to the field of switching power converters. Particularly, the present disclosure relates to a DC-DC switching power converter.

BACKGROUND

A DC-DC switching power converter (hereinafter simply referred to as DC-DC converter) is a type of power converter configured to convert a direct current (DC) input voltage into a direct current (DC) output voltage having a value generally different from the DC input voltage.

DC-DC switching converters (also referred to as DC-DC power converters, and hereafter referred to as DC-DC converters) are a class of Switched-Mode Power Supply (SMPS). DC-DC converters are often used in electronic systems supplied by a power source (such as a battery) and one or more electronic/electro-mechanic components each one operating at a respective DC voltage.

The operation of this kind of converter is mainly based on a semiconductor switching technique. The basic configuration provides for a switching stage configured to implement the power conversion—comprising in turn one or more semiconductor switches, at least one inductor for storing energy and at least one filtering capacitor—and a switching control stage configured to control the switching of the semiconductor switches of the switching stage. Usually, the inductor and the filtering capacitor are components external to the Integrated Chip (IC) wherein the other components of the DC-DC converter are integrated.

The semiconductor switches are controlled by the switching control stage to be repeatedly closed and opened at a corresponding switching frequency with a corresponding duty cycle through a corresponding switching signal (e.g., a square signal) oscillating at the switching frequency and having said duty cycle. The value of the duty cycle of the switching signal sets the value of the DC output voltage.

Among the known types of DC-DC converters, the so-called buck or step-down converter (hereinafter simply referred to as buck converter) is a DC-DC converter configured to step down voltage from its input (coupled with a power source) to its output (coupled with a load). In a buck converter, the output voltage corresponds to a fraction of the input voltage corresponding to the duty cycle of the switching signal.

Buck converters of the so-called "current mode" operates in a closed loop configuration in which:
- an error amplifier amplifies an error between the actual value of the output voltage and a target reference voltage, and
- the output of the error amplifier is used to set the amount of current to be delivered from the input to the output by accordingly set the duty cycle of the switching signal.

In order to guarantee stability of this closed loop configuration for a range of different switching frequency, inductor inductance and filtering capacitor capacitance values, a proper compensation network is required.

According to a solution known in the art, the compensation network is implemented through a compensation network that is external to the DC-DC converter IC.

According to another solution known in the art, the compensation network is digitally implemented by means of a programmable digital loop and programmable digital filters integrated in the DC-DC converter IC.

According to a still further solution known in the art, a compensation network is integrated in the DC-DC converter IC that is dimensioned to guarantee stability for a corresponding expected range of switching frequency values.

SUMMARY

The solutions known in the art for implementing the compensation network are not satisfactory, being affected by drawbacks.

The solutions providing for a compensation network that is external to the DC-DC converter IC require number of additional external components and the use of a dedicated pin in the DC-DC converter IC for the connection of said additional external components.

The solutions providing for a compensation network that is digitally implemented by means of a programmable digital loop and programmable digital filters require the introduction of a dedicated fast Analog to Digital Converter (ADC), and imply high power consumptions.

The solutions providing for a compensation network that is dimensioned to guarantee stability for an expected range of switching frequency values is not efficient because in order to guarantee stability for the lowest switching frequencies in the expected range, the compensation network has to be unavoidably dimensioned so as to cause excessively long transients when the DC-DC converter operates at the higher switching frequencies in the expected range.

In view of the above, Applicant devised a solution to implement an improved DC-DC converter that is not affected by the abovementioned drawbacks.

According to an embodiment of the present disclosure, a DC-DC switching power converter configured to convert a DC input voltage into a DC output voltage is provided.

The DC-DC switching power converter comprises a switching stage comprising switches and configured to receive the DC input voltage and generate the DC output voltage through the switching of said switches.

The DC-DC switching power converter comprises a switching control stage configured to control the switching of the switches through a switching signal at a corresponding switching frequency with a corresponding duty cycle.

The DC output voltage generated by the switching stage depends on said duty cycle.

The switching control unit is configured to implement a closed loop regulation of the DC output voltage by setting the duty cycle based on a difference between the DC output voltage and a reference voltage.

The DC-DC switching power converter further comprises a compensation network to guarantee stability of the operation of the DC-DC switching power converter.

The compensation network has a capacity having a value depending on the switching frequency.

Thanks to the compensation network having a capacity value depending on the switching frequency, the output of the DC-DC switching power converter can be advantageously kept stable for a wide range of different switching frequency values, without incurring in (or at least strongly reducing) undesired increases in transients of the output voltage.

According to an embodiment of the present disclosure, the compensation network is configured in such a way that:
the higher the switching frequency, the lower the capacity of the compensation network, and
the lower the switching frequency, the higher the capacity of the compensation network.

According to an embodiment of the present disclosure, the compensation network comprises at least one variable capacitor, said at least one variable capacitor comprising a base capacitor and a set of additional capacitors selectively connectable in parallel to the base capacitor by means of respective additional switches driven by respective control signals.

According to an embodiment of the present disclosure, the DC-DC switching power converter further comprises a logic unit configured to generate said control signals for driving said additional switches based on an information about said switching frequency.

According to an embodiment of the present disclosure, said logic unit is configured to generate said control signals for driving said additional switches based on a frequency of an external clock signal received by the DC-DC switching power converter.

According to an embodiment of the present disclosure, said at least one variable capacitor comprises a precharge circuit configured to charge the additional capacitors that are not connected in parallel to the base capacitor.

In this way, according to an embodiment of the present disclosure, a precharge voltage develops across said additional capacitors that are not connected in parallel to the base capacitor.

According to an embodiment of the present disclosure, said precharge voltage corresponds to the voltage across the base capacitor.

According to an embodiment of the present disclosure, the DC-DC switching power converter further comprises a current sensor for sensing a first current across at least one of said switches of the switching stage.

According to an embodiment of the present disclosure, the DC-DC switching power converter comprises a transconductance amplifier configured to generate a second current depending on a difference between said output voltage and said reference voltage.

According to an embodiment of the present disclosure, the DC-DC switching power converter comprises a comparator configured to compare a first voltage depending on said second current with a second voltage depending on said sensed first current to produce a corresponding comparison signal.

According to an embodiment of the present disclosure, the switching control stage is configured to set the duty cycle of the switching signal based on said comparison signal.

According to an embodiment of the present disclosure, said compensation network is connected to the output of said transconductance amplifier.

In this way, according to an embodiment of the present disclosure said first voltage depends on said second current and on an impedance of the compensation network.

According to an embodiment of the present disclosure, the DC-DC switching power converter is a buck converter.

Another embodiment of the present disclosure relates to an electronic system comprising at least one DC-DC switching power converter.

BRIEF DESCRIPTION OF THE DRAWINGS

The above features and advantages of the present disclosure, as well as additional features and advantages, will be made apparent by the following detailed description of exemplary embodiments thereof. For its better intelligibility, the following description should be read making reference to the annexed figures, wherein.

DETAILED DESCRIPTION OF ILLUSTRATIVE EMBODIMENTS

Figure 1:
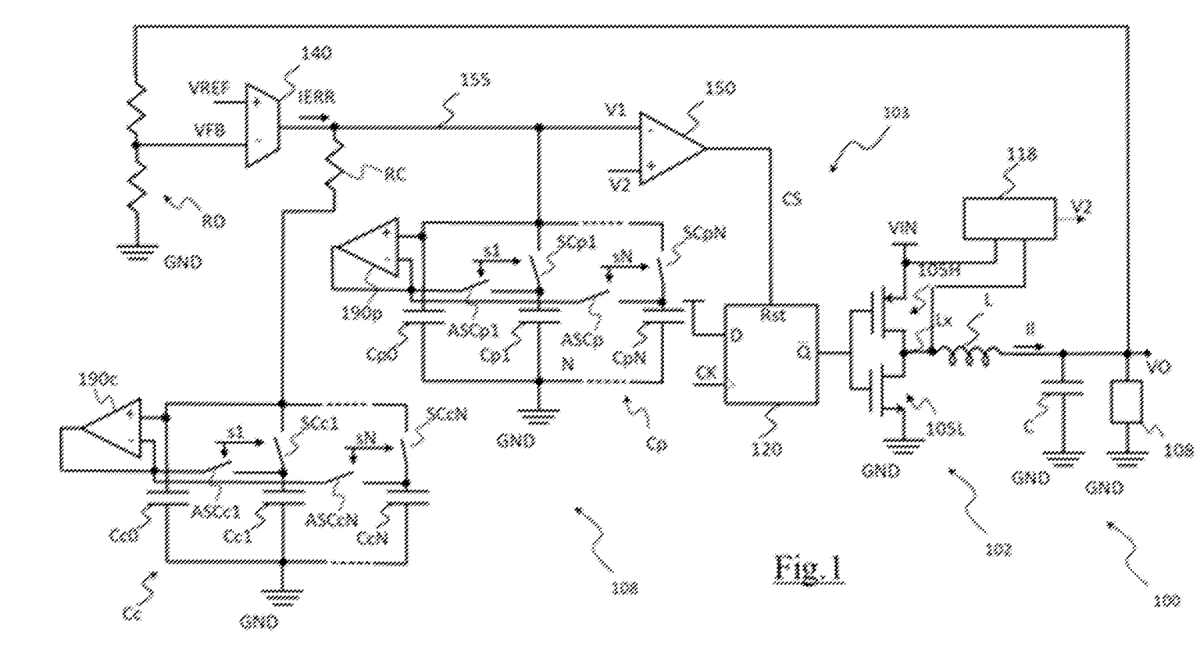
FIG. 1 is a circuit diagram of a (portion of a) DC-DC converter according to an embodiment of the present disclosure.

FIG. 1 is a circuit diagram of a (portion of a) DC-DC converter 100 according to an embodiment of the present disclosure. In particular, the DC-DC converter 100 depicted in FIG. 1 is a buck converter, configured to convert a DC input voltage VIN to a DC output voltage VO lower than the input voltage VIN.

The DC-DC converter 100 comprises a switching stage, globally identified with reference 102 and a switching control stage, globally identified with reference 103.

Without entering into excessive details not relevant for the understanding of the solution and well known to those skilled in the art, the switching stage 102 comprises a high side switch 105H and a low side switch 105L connected in series between a terminal providing the input voltage VIN and a terminal providing a reference voltage GND. In an embodiment of the disclosure, the high side switch 105H comprises a p-MOS transistor (p-MOSFET) and the low side switch 105L comprises an n-MOS transistor (n-MOSFET). The source terminal of the p-MOSFET 105H is coupled to the terminal providing the input voltage VIN, the drain terminal of the p-MOSFET 105H is coupled to the drain terminal of the n-MOSFET 105L, and the source terminal of the n-MOSFET 105L is coupled to the terminal providing the reference voltage GND. The drain terminal of the p-MOSFET 105H and the drain terminal of the n-MOSFET 105L are coupled to a switching terminal LX.

The switching terminal LX is coupled to a first terminal of an inductor L. The inductor L has a second terminal connected to a first terminal of a filtering capacitor C, defining an output terminal OUT for providing the output voltage VO to a load 108 connected to said output terminal OUT. The filtering capacitor C has a second terminal connected to a terminal providing the reference voltage GND.

The high side switch 105H and the low side switch 105L are controlled by the switching control stage 103 to be repeatedly closed and opened at a corresponding switching frequency fsw with a corresponding duty cycle D through a corresponding switching signal SW (e.g., a square signal) oscillating at the switching frequency fsw and having said duty cycle D.

When the switching signal SW is low, the high side switch 105H is on, while the low side switch 105L is off. In this condition, the inductor L is coupled to the terminal providing the input voltage VIN, and crossed by a corresponding current I1 causing energy be stored in the inductor L.

When the switching signal SW is high, the high side switch 105H is off, while the low side switch 105L is on. In this condition, the inductor L is decoupled from the terminal providing the input voltage VIN and the current I1 is provided by the energy previously stored in the inductor L.

The output voltage VO at the output terminal has a value set by the duty cycle D of the switching signal SW. The higher the duty cycle D—meaning the higher the portion of the generic period of the switching signal SW during which the high side switch 105H is on and the inductor L is connected to the terminal providing the input voltage VIN—the higher the output voltage Vo.

According to an embodiment of the present disclosure, the switching control unit 103 is configured to control the duty cycle D of the switching signal SW so that the output voltage VO is regulated to be as much as possible equal to a reference voltage VREF. According to an embodiment of the present disclosure, the switching control unit 103 is configured to regulate the output voltage VO by means of a closed loop regulation by setting the duty cycle D of the switching signal SW based on a difference between the output voltage VO and the reference voltage VREF.

For this purpose, according to an embodiment of the present disclosure, a feedback network is provided for establishing a (feedback) closed loop, in which a feedback voltage VFB depending on the actual output voltage VO is provided to the switching control unit 103.

According to an embodiment of the present disclosure, the feedback voltage VFB is proportional to the output voltage VO. According to an embodiment of the present disclosure, the feedback voltage VFB is obtained from the output voltage VO through a resistive voltage divider RD. Naturally, similar considerations apply in case the feedback voltage VFB is obtained in a different way, such as in the case the feedback voltage VFB is directly the output voltage VO.

As will be described in detail in the following, according to an embodiment of the disclosure, the regulation of the output voltage VO carried out by the switching control stage 103 provides for controlling the duty cycle D of the switching signal SW based on how the current I1 evolves in time during the operation of the DC-DC converter 100. For this reason, according to an embodiment of the present disclosure, a current sensor 118 is provided, for example between the terminal providing the input voltage VIN and the source terminal of the high side switch 105H, configured to sense the current I1.

According to an embodiment of the present disclosure, the switching control stage 103 comprises a switching signal generator unit 120 configured to generate the switching signal SW (and particularly to set the duty cycle D thereof) according to the sensed current I1 and according to the reference voltage VREF.

According to an embodiment of the present disclosure, the switching signal generator unit 120 is configured to set the duty cycle D of the switching signal SW according to a comparison between (a voltage V1 depending on) the actual sensed current I1 and a (voltage V2 depending on a) reference current IREF, wherein said reference current IREF depends on a difference between the actual output voltage VO and the reference voltage VREF.

For this purpose, according to an embodiment of the present disclosure, the feedback voltage VFB is provided to an error amplifier 140 configured to generate an error current IERR based on a difference between the feedback voltage VFB (depending on the output voltage VO) and the reference voltage VREF.

According to an embodiment of the present disclosure, the error amplifier 140 is a transconductance amplifier having a first input (e.g., a non-inverting input) receiving the reference voltage VREF, a second input (e.g., an inverting input) receiving the feedback voltage VFB, and an output providing the error current IERR as a function of the difference between VREF and VFB.

According to an embodiment of the present disclosure, the output terminal of the error amplifier 140 is connected to a first input terminal (e.g., an inverting terminal) of a comparator 150 to provide a first comparator voltage $V1=Z*IERR$, where Z is the impedance of the circuit node 155 between the output terminal of the error amplifier 140 and the first input terminal of the comparator 150. The reference current IREF to be compared with the actual sensed current I1 to set the duty cycle D of the switching signal SW is proportional to the voltage V1. According to an embodiment of the present disclosure, the comparator 150 has a second input terminal (e.g., a non-inverting input terminal) configured to receive a second comparator voltage V2 based on the current I1 sensed by the current sensor 118. For example, the second comparator voltage V2 is proportional to the current I1 sensed by the current sensor 118. According to an embodiment of the present disclosure, the comparator 150 has an output terminal coupled to the switching signal generator unit 120 for providing a switching control signal CS equal to a high value when V2 is higher than V1 and a low value when V2 is lower than V1. In this way, the value taken by the switching control signal CS depends on a comparison between the reference current IREF (depending on V1) and the actual sensed current I1 (depending on V2).

According to the embodiment of the disclosure illustrated in FIG. 1, the switching signal generator unit 120 comprises a D flip-flop, having a data input always at a high logic value, a clock input receiving a clock signal CK oscillating at the switching frequency fsw, a reset input coupled to the output of the comparator 150 for receiving the switching control signal CS, and a negated output coupled to the gate terminals of the switches 105H and 105L for providing the switching signal SW.

At the beginning of a generic period of the clock signal CK, since the data input of the switching signal generator unit 120 is at the high level, the switching signal SW is at a low value, turning on the high side switch 105H and turning off the low side switch 105L. The current I1 across the inductor L starts to accordingly rise, causing a corresponding increasing of the second comparator voltage V2. When the value of the current I1 exceeds the value of the reference current IREF, the second comparator voltage V2 exceeds the first comparator voltage V1, and the switching control signal CS goes to the low value. In this condition, the switching signal SW switches to a high value, turning off the high side switch 105H and turning on the low side switch 105L. This condition is maintained until the end of the period of the clock signal CK. Then, a new period starts with the switching signal SW that returns to the low value.

In this way, the duty cycle D of the switching signal SW is set by taking into account the time spent by the current I1 to reach the reference current IREF. The longer the time required by the current I1 to reach the reference current IREF, the higher the duty cycle D, and vice versa.

It is underlined that although the switching signal generator unit 120 illustrated in FIG. 1 comprises a D flip-flop, the concepts of the present disclosure can be applied to other different circuit implementations, for example other circuit implementations in which the switching signal SW is set by taking into account the time spent by the current I1 to reach the reference current IREF—e.g., the time spent by the second comparator voltage V2 to reach the first comparator voltage V1. These circuit implementations provide for a so-called "peak control" scheme in which a transition in the switching control signal CS is triggered (causing a corresponding transition in the switching signal SW) when the current I1 (and therefore the second comparator voltage V2) exceeds the reference current IREF (and therefore the first comparator voltage V1), reaching its peak value. However, similar considerations apply in case of a so-called "valley control" scheme, in which the functions of the first comparator voltage V1 and the second comparator voltage V2 are swapped, the switching signal SW is inverted, and the transition in the switching control signal CS is triggered when the current I1 reaches its minimum value.

According to an embodiment of the present disclosure, since the DC-DC converter 100 is configured to operate in a closed loop configuration, a compensation network 180 is advantageously provided having an impedance such to guarantee stability of the DC-DC converter 100 during its operation.

According to an embodiment of the present disclosure, the compensation network 180 is configured to set the impedance Z at the circuit node 155 in such a way to be dependent on the actual switching frequency fsw of the switching signal SW used by the DC-DC converter 100 during its operation.

According to an embodiment of the present disclosure, the compensation network 180 is configured to introduce in the closed-loop transfer function of the DC-DC converter 100 a dominant pole P1 and a zero Z1, wherein the frequency location of said zero Z1 is based on the actual switching frequency fsw of the switching signal SW used by the DC-DC converter 100 during its operation. The frequency position of the zero Z1 determines the recovery time during a load transient response.

According to an embodiment of the present disclosure, the compensation network 180 is further configured to introduce in the closed-loop transfer function of the DC-DC converter 100 a second higher frequency pole P2 to reduce the gain at frequencies close to the actual switching frequency fsw of the switching signal SW used by the DC-DC converter 100 during its operation.

According to an embodiment of the present disclosure, the compensation network 180 is configured to set the frequency location of the higher frequency pole P2 in order to be out of the expected bandwidth of the DC-DC converter 100.

According to an embodiment of the present disclosure, the compensation network 180 is configured in such a way that:
  the higher the actual switching frequency fsw of the switching signal SW, the higher the frequency locations of the poles P1, P2 and of the zero Z1, and
  the lower the actual switching frequency fsw of the switching signal SW, the lower the frequency locations of the poles P1, P2 and of the zero Z1.

By having the frequency locations of the poles P1, P2 and of the zero Z1 that depend on the actual switching frequency fsw of the switching signal SW, the compensation network 180 according to the embodiments of the disclosure advantageously allows to guarantee stability, reducing at the same time the duration of output voltage VO transients caused by load 108 variations, for different switching frequency fsw values.

According to an embodiment of the present disclosure, the compensation network 180 is configured to have a trimmable capacity having a value depending on the actual switching frequency fsw of the switching signal SW.

According to an embodiment of the present disclosure, the compensation network 180 is configured in such a way that:
  the higher the actual switching frequency fsw of the switching signal SW, the lower the capacity of the compensation network 180, and
  the lower the actual switching frequency fsw of the switching signal SW, the higher the capacity of the compensation network 180.

According to an embodiment of the present disclosure, the compensation network 180 comprises a resistor Re, a first variable capacitor Cc and a second variable capacitor Cp.

According to an embodiment of the present disclosure, the resistor Re has a first terminal connected to the circuit node 155, and a second terminal connected to a first terminal of the first variable capacitor Cc. According to an embodiment of the present disclosure, the first variable capacitor Cc has a second terminal connected to a terminal providing the reference voltage GND. According to an embodiment of the present disclosure, the second variable capacitor Cp has a first terminal connected to the circuit node 155 and a second terminal connected to the terminal providing the reference voltage GND.

According to an embodiment of the present disclosure, the first variable capacitor Cc comprises a base capacitor Cco and a group of N additional capacitors Cci (i=1 to N) selectively connectable in parallel to the base capacitor Cco by means of respective switches SCci (i=1 to N).

According to an embodiment of the disclosure, each switch SCci is driven by a respective digital control signal si (i=1 to N) configured to take:
  a first value for closing the switch SCci—and therefore to connect the additional capacitor Cci in parallel to the base capacitor Cco, and
  a second value for opening the switch SCci—and therefore to disconnect the additional capacitor Cci from the base capacitor Cco,
In this way, by properly setting an N-bit code word CW comprising the values of the N digital control signal si, it is possible to set the capacitance of the first variable capacitor Cc.

Similarly, according to an embodiment of the present disclosure, the second variable capacitor Cp comprises a base capacitor Cpo and a group of N additional capacitors Cpi (i=1 to N) selectively connectable in parallel to the base capacitor Cpo by means of respective switches SCpi (i=1 to N).

According to an embodiment of the disclosure, each switch SCci is driven by a respective one among the digital control signals si (i=1 to N), so that also the capacitance of the second variable capacitor Cp can be set by properly setting the N-bit code word CW.

According to an embodiment of the present disclosure, the code word CW is set, for example by a logic unit included in a control unit of the DC-DC converter 100 not illustrated in FIG. 1, based on the actual switching frequency fsw.

According to an embodiment of the present disclosure, the code word CW is set in such a way that:

the higher the actual switching frequency fsw of the switching signal SW, the lower the capacities of the first and second variable capacitors Cc, Cp, and the lower the actual switching frequency fsw of the switching signal SW, the higher the capacitances of the first and second variable capacitors Cc, Cp.

In this way, the output of the DC-DC converter 100 can be advantageously kept stable for a wide range of different switching frequency fsw values, without incurring in (or at least strongly reducing) undesired increases in transients of the output voltage VO, because the stability is obtained through an efficient positioning of the poles P1, P2 and of the zero Z1—through a proper setting of the capacitances of the first and second variable capacitors Cc, Cp—tailored on the actual value of the switching frequency fsw.

Figure 2:
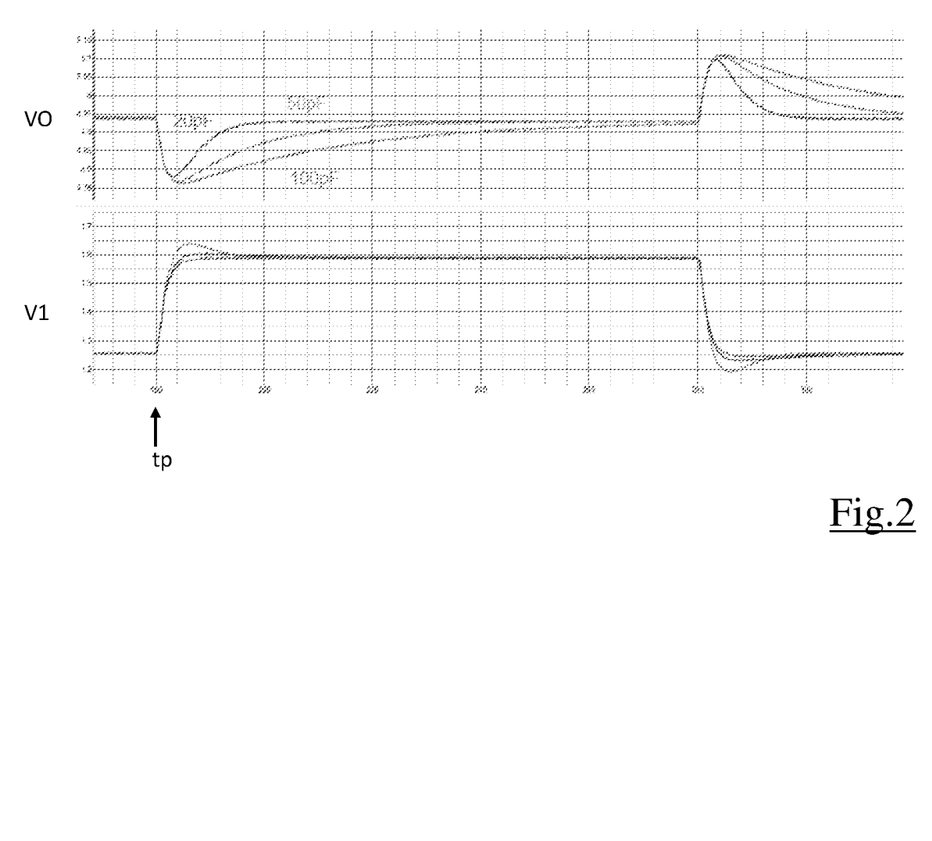
FIG. 2 illustrates exemplary time diagrams showing how some voltages in the DC-DC converter of FIG. 1 evolve over time.

FIG. 2 illustrates exemplary time diagrams showing how the output voltage VO and the first comparator voltage V1 evolve over time for different values of the first variable capacitor Cc (20 pF, 50 pF, 100 pF) when the load 108 introduces a perturbation (e.g., an increased current request) at time tp.

In this exemplary case, the input voltage VIN is 24V, the reference voltage VREF is 5V, the switching frequency fsw is 1 MHz, the filtering capacitor C has a capacity of 2 uF, and the inductor L has an inductance of 68 uH.

From the time diagrams illustrated in FIG. 2, it can be seen that in all the three cases—Cc having a capacitance of 20 pF, 50 pF, and 100 pF—the output stability is guaranteed, but different transients of the output voltage VO are obtained. The compensation network 180 according to the embodiment of the disclosure is configured to select a value for the capacitance of Cc such that the positions of the poles P1, P2 and of the zero Z1 cause a reduced transient following the perturbation occurrence.

In some applications, the DC-DC converter 100 operates with a variable switching frequency fsw that is not known a priori. For example, if the DC-DC converter 100 is employed in a radio frequency system, the noise introduced by the switching of the switches 105H and 105L may cause interference impairing the correct operation of the radio frequency system. In a situation of this kind, it is important to be capable of varying the switching frequency fsw to avoid the undesired interference.

If the switching frequency fsw is varied during the operation of the DC-DC converter 100, the compensation network 180 should accordingly adapts itself to the new switching frequency fsw by modifying the positions of the poles P1, P2 and of the zero Z1 according to the new switching frequency fsw through the connection/disconnection of (some) additional capacitors Cci, Cpi to/from the base capacitors Cco, Cpo by means of the switches SCci and SCpi.

However, connecting new additional capacitors Cci, Cpi in parallel to the base capacitors Cco, Cpo involves a charge sharing among the plates of the capacitors, causing undesired spikes in the output voltage VO. Since the switching frequency fsw change is not known a priori, also the new configurations of the variable capacitors Cc and Cp carried out by the compensation network 180 for adapting the compensation are not known a priori. This means that the also the charge sharing among the plates of the capacitors is not known a priori.

According to an embodiment of the present disclosure, this problem is solved, or at least strongly mitigated, by having the compensation network 180 that is configured to precharge the additional capacitors Cci, Cpi to the voltage across the base capacitors Cco, Cpo.

For this reason, according to an improved embodiment of the present disclosure, the first variable capacitor Cc further comprises a precharge circuit configured to precharge the additional capacitors Cci, to the voltage across the base capacitor Cco, and the second variable capacitor Cp further comprises a precharge circuit configured to precharge the additional capacitors Cpi, to the voltage across the base capacitor Cpo.

By making reference again to FIG. 1, according to an improved embodiment of the disclosure, the precharge circuit of the first variable capacitor Cc comprises a voltage buffer 190c—e.g., an operational amplifier in a voltage follower configuration—having an input terminal connected to the terminal of the base capacitor Cco connected to the resistor Re, and an output terminal that is coupled to the circuit nodes between each additional capacitor Cci (i=1 to N) and the switch SCci (i=1 to A) through a corresponding additional switch ASCci (i=1 to N).

According to an embodiment of the present disclosure, each additional switch ASCci corresponding to an additional capacitor Cci is configured to be open when the switch SCci is closed, and to be closed when the switch SCci is open.

In this way, when a switch SCci is driven to be closed for connecting the additional capacitor Cci in parallel to the base capacitor Cco, said additional capacitor Cci is already precharged to have the same voltage difference across the base capacitor Cco, avoiding (or at least reducing) charge sharing between the capacitors.

Similarly, according to an improved embodiment of the disclosure, the precharge circuit of the second variable capacitor Cc comprises a voltage buffer 190p having an input terminal connected to the terminal of the base capacitor Cpo connected to the circuit node 155, and an output terminal that is coupled to the circuit nodes between each additional capacitor Cpi (i=1 to A) and the switch SCpi (i=1 to A) through a corresponding additional switch ASCpi (i=1 to N).

According to an embodiment of the present disclosure, each additional switch ASCpi corresponding to an additional capacitor Cpi is configured to be open when the switch SCpi is closed, and to be closed when the switch SCpi is open.

In this way, when a switch SCpi is driven to be closed for connecting the additional capacitor Cpi in parallel to the base capacitor Cpo, said additional capacitor Cpi is already precharged to have the same voltage difference across the base capacitor Cpo, avoiding (or at least reducing) charge sharing between the capacitors.

According to an embodiment of the present disclosure, the N-bit code word CW for driving the N switches SCci and the N switches SCpi (and, preferably, also the N additional switches SCci, and the N additional switches SCpi) is generated by the control unit of the DC-DC converter 100 based on an information about the actual switching frequency fsw provided to the DC-DC converter 100.

According an embodiment of the present disclosure, the information about the actual switching frequency fsw is provided by feeding the DC-DC converter 100 with an external clock signal oscillating at the switching frequency fsw.

Figure 3A:
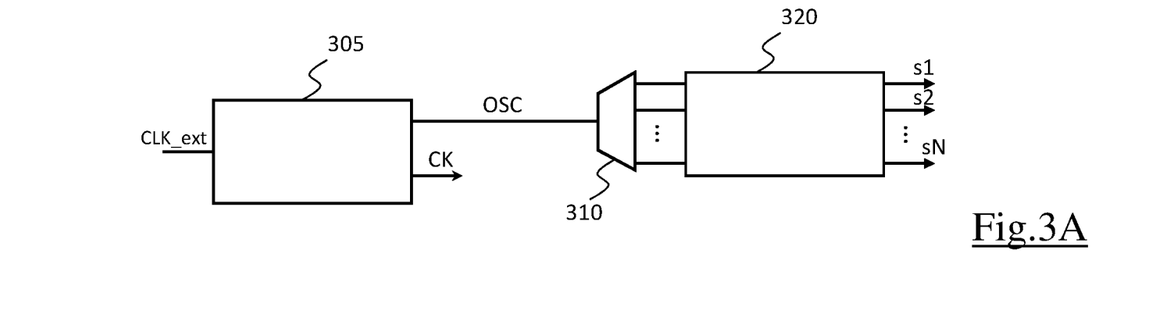
FIGS. 3A and 3B illustrate two embodiments of the disclosure in which an information about a switching frequency is provided to the DC-DC converter of FIG. 1 in form of an external clock signal.
Figure 3B:
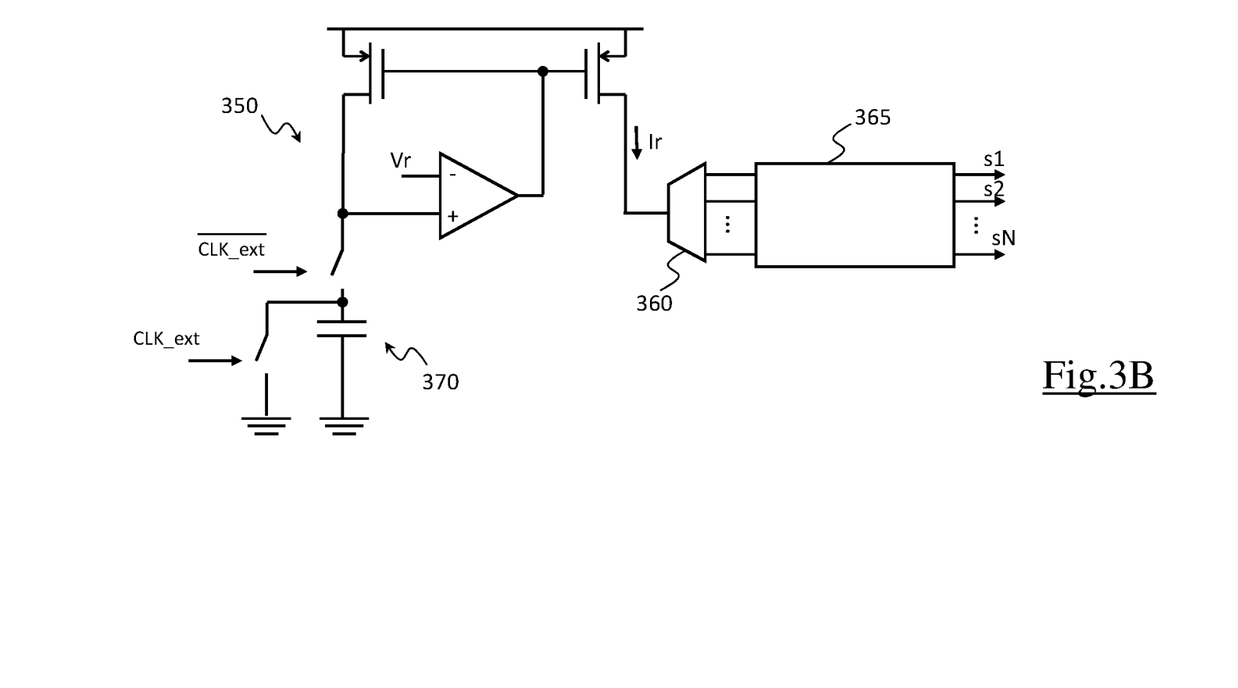

FIGS. 3A and 3B illustrate two exemplary embodiments of the disclosure in which the information about the actual switching frequency fsw is provided in form of an external clock signal—identified in said figures with reference CLK_ext—oscillating at the switching frequency fsw.

In the exemplary embodiment of the disclosure illustrated in FIG. 3A, the external clock signal CLK_ext is fed to a Phase-Locked Loop (PLL) unit 305 of that accordingly generates the clock signal CK (see FIG. 1) and a corresponding analog signal OSC (e.g., a voltage or a current signal) having an amplitude proportional to the switching frequency fsw.

According to an embodiment of the disclosure, the amplitude of the signal OSC is converted into a digital value by means of an analog-to-digital converter (ADC) 310. Said digital value is then decoded by a decoder unit 320 into the N-bit code word CW for driving the N switches SCci and the N switches SCpi—and, preferably, also the N additional switches SCci, and the N additional switches SCpi—(see FIG. 1).

According to an embodiment of the present disclosure, the decoder unit 320 is configured so that the configuration of the first and second variable capacitors Cc, Cp is such that:
the higher the actual switching frequency fsw of the switching signal SW, the lower the capacities of the first and second variable capacitors Cc, Cp, and
the lower the actual switching frequency fsw of the switching signal SW, the higher the capacitances of the first and second variable capacitors Cc, Cp.

In the exemplary embodiment of the disclosure illustrated in FIG. 3B, instead of using a PLL unit, the external clock signal CLK_ext is fed to a switched-capacitor circuit 350 configured to generate a current Ir having a value proportional to the frequency of the external clock signal CLK_ext. In a similar way to that illustrated in FIG. 3A, the amplitude of the current Ir—proportional to the switching frequency fsw—is converted into a digital value by means of an ADC 360, which is in turn decoded by a decoder unit 365 into the N-bit code word CW.

Without entering into details well known to those skilled in the art, the switched-capacitor circuit 350 according to an embodiment of the present disclosure provides for converting the frequency value of the external clock signal CLK_ext (equal to fsw) into a corresponding resistance value R through a switched-capacitor resistor 370 and setting the current Ir to Vr/R, wherein Vr is the value of a reference voltage Vr.

According to another embodiment of the disclosure not illustrated in the figures, the information about the actual switching frequency fsw is provided in form of a digital word, for example stored in a register of the DC-DC converter 100, and then decoded into the N-bit code word CW by the decoder unit 365.

According to a still another embodiment of the disclosure not illustrated in the figures, the information about the actual switching frequency fsw is provided by the resistance of a resistor connected to a dedicated pin of the chip wherein the DC-DC converter 100 is integrated, and then decoded into the N-bit code word CW by the decoder unit 365.

Figure 4:
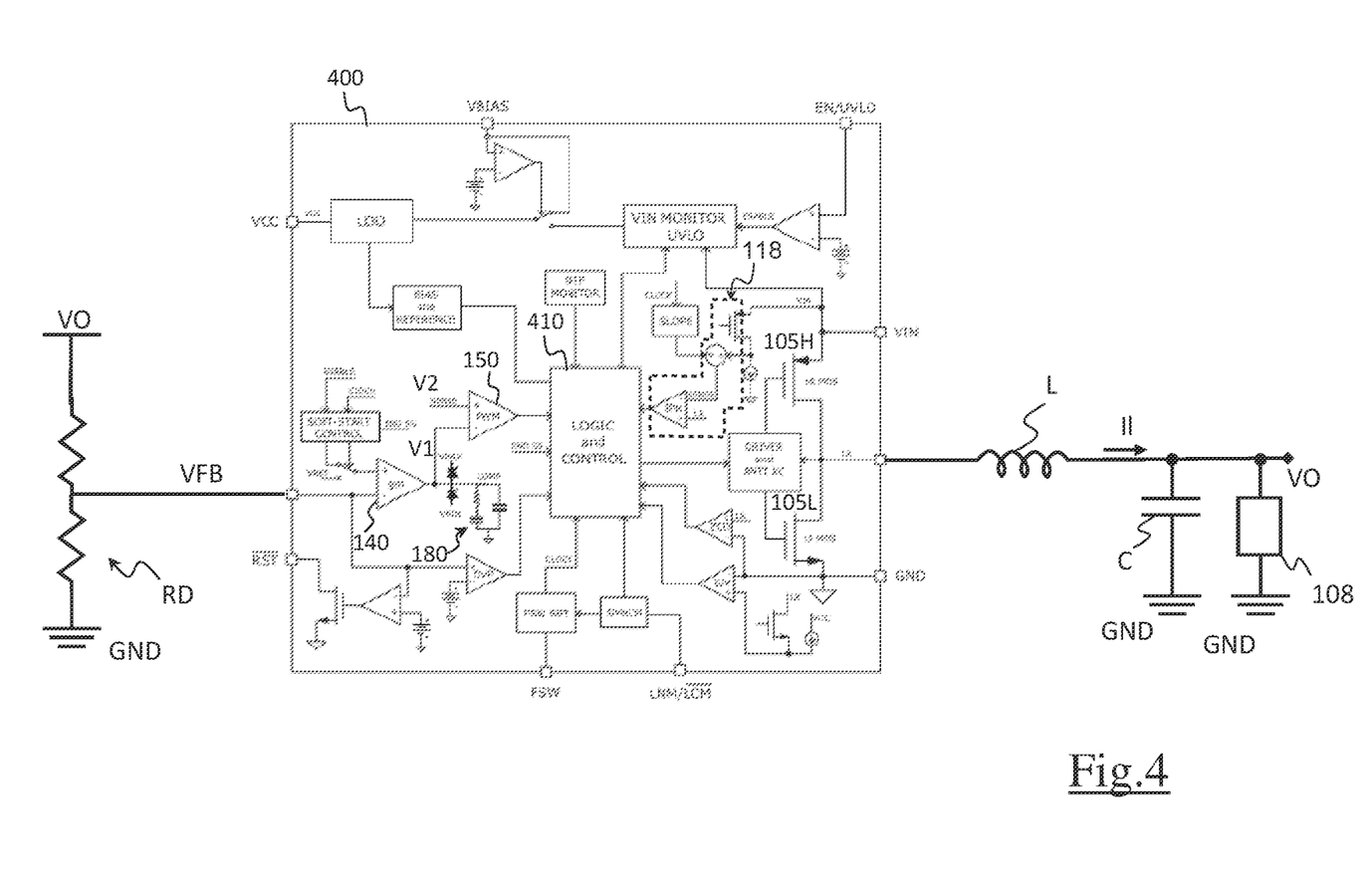
FIG. 4 shows in terms of functional blocks an exemplary on-chip implementation of the DC-DC converter of FIG. 1.

FIG. 4 shows in terms of functional blocks an exemplary on-chip implementation of the DC-DC converter 100 according to the embodiments of the disclosure described. The chip wherein components of the DC-DC converter 100 are integrated (not including the external components like the inductor L, the filtering capacitor C and the resistive voltage divider RD) is globally identified with reference 400. In the exemplary on-chip implementation illustrated in FIG. 4, the switching signal generator unit 120 (see FIG. 1) and the unit(s) for generating the N-bit code word CW for driving the switches SCci and SCpi of the compensation network 180 are implemented by a logic and control unit identified with reference 410.

Figure 5:
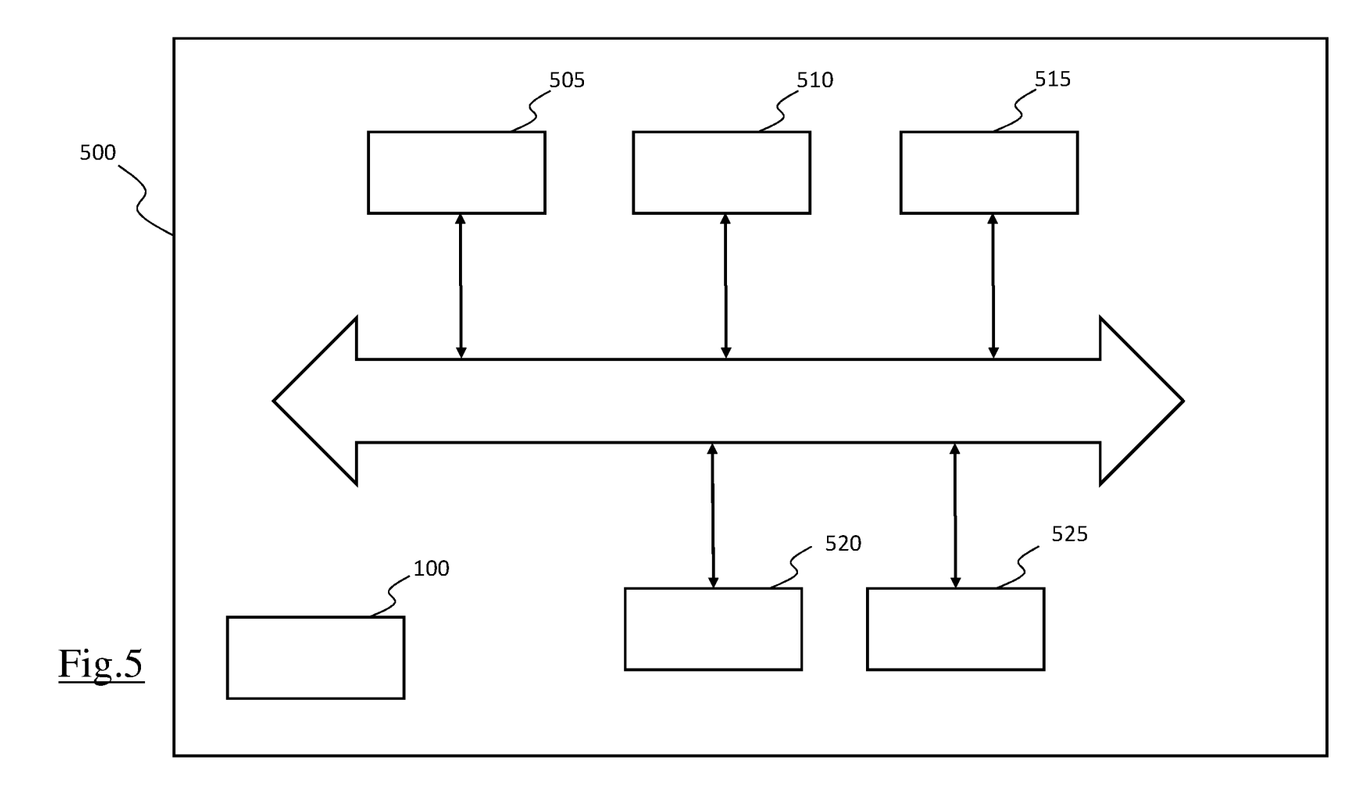
FIG. 5 illustrates in terms of simplified blocks an electronic system comprising the DC-DC converter of FIG. 1.

FIG. 5 illustrates in terms of simplified blocks an electronic system 500 (or a portion thereof) comprising at least one DC-DC converter 100 according to the embodiments of the disclosure described above.

According to an embodiment of the present disclosure, the electronic system 500 may be for example a personal digital assistant, a computer, a tablet, and a smartphone.

According to an embodiment of the present disclosure, the electronic system 500 may comprise, a controller 505, such as for example one or more microprocessors and/or one or more microcontrollers.

According to an embodiment of the present disclosure, the electronic system 500 may comprise an input/output device 510 (such as for example a keyboard, and/or a touch screen and/or a visual display) for generating/receiving messages/commands/data, and/or for receiving/sending digital and/or analogic signals.

According to an embodiment of the present disclosure, the electronic system 500 may comprise a wireless interface 515 for exchanging messages with a wireless communication network (not shown), for example through radiofrequency signals. Examples of wireless interface 515 may comprise antennas and wireless transceivers.

According to an embodiment of the present disclosure, the electronic system 500 may comprise a storage device 520, such as for example a volatile and/or a non-volatile memory device.

According to an embodiment of the present disclosure, the electronic system 500 may comprise a battery 525.

According to an embodiment of the present disclosure, the electronic system 500 may comprise one or more communication channels (buses) for allowing data exchange between the controller 505, and/or the input/output device 510, and/or the wireless interface 515, and/or the storage device 520, and/or the battery 525, when they are present.

According to an embodiment of the present disclosure, at least one among the controller 505, the input/output device 510, the wireless interface 515, the storage device 520 and the battery 525 is supplied by the DC output voltage generated by the one or more DC-DC converters 100.

Naturally, in order to satisfy local and specific requirements, a person skilled in the art may apply to the solution described above many logical and/or physical modifications and alterations. More specifically, although the present disclosure has been described with a certain degree of particularity with reference to preferred embodiments thereof, it should be understood that various omissions, substitutions and changes in the form and details as well as other embodiments are possible. In particular, different embodiments of the disclosure may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the disclosure may be incorporated in other embodiments.

Although in the present description reference has been made in particular to a buck converter having a switching stage comprising a p-MOS high side switch and an n-MOS low side switch, the concepts of the present disclosures directly apply to other cases in which a different number of (semiconductor) switches are provided and/or the (semiconductor) switches are arranged in a different configuration.

For example, an-n half bridge switching stage can be provided, in which both the high side switch and the low side switch are n-MOS transistors. Since integrated n-MOS transistors have a lower resistance compared to the one of p-MOS transistors (considering a same area), a switching stage of this type is particularly suited for those applications in which high load current are expected, and/or for reducing the silicon area occupation required for implementing the switching stage. Naturally, if an n-n half bridge is used, the switching signal used for controlling the switching of the high and low side switches should be accordingly modified.

Furthermore, instead of being formed in the chip wherein the other components of the DC-DC converter are integrated, the switches of the switching stage can be also provided outside said chip. This particular configuration can be advantageously exploited in those applications in which a high thermal dissipation and/or large switches are required, for example for managing very high load currents (e.g., dozens of Amperes).

Other examples of different switching stages provide for semiconductor switches arranged in a full-bridge configuration.

Moreover, the concepts of the present disclosures can be also applied to different kinds of DC-DC converters, such as boost converters and buck-boost converters.

What is claimed is:

1. A DC-DC switching power converter, comprising:
   a switching circuitry comprising switches, the switching circuitry configured to receive a DC input voltage and generate a DC output voltage through switching the switches;
   a switching control circuitry configured to control switching of the switches with a switching signal having a corresponding switching frequency with a corresponding duty cycle, the DC output voltage generated by the switching circuitry depending on the duty cycle, wherein the switching control circuitry is configured to set the duty cycle based on a difference between the DC output voltage and a reference voltage in a closed loop configuration; and
   a compensation network having a variable capacitance value, wherein the compensation network is configured to provide stability to an operation of the DC-DC switching power converter by adjusting the variable capacitance based on the switching frequency.

2. The DC-DC switching power converter of claim 1, wherein the compensation network comprises at least one variable capacitor, wherein the at least one variable capacitor comprises a base capacitor and a set of additional capacitors selectively connectable in parallel to the base capacitor by respective additional switches driven by respective control signals.

3. The DC-DC switching power converter of claim 2, further comprising a logic unit configured to generate the control signals for driving the additional switches based on information about the switching frequency.

4. The DC-DC switching power converter of claim 3, wherein the logic unit is configured to generate the control signals for driving the additional switches based on a frequency of an external clock signal received by the DC-DC switching power converter.

5. The DC-DC switching power converter of claim 2, wherein the at least one variable capacitor comprises a precharge circuit configured to charge the additional capacitors that are not connected in parallel to the base capacitor in such a way that a precharge voltage develops across the additional capacitors that are not connected in parallel to the base capacitor, the precharge voltage corresponding to a voltage across the base capacitor.

6. The DC-DC switching power converter of claim 1, wherein the switching control circuitry comprises an error amplifier having a first input terminal configured to receive the reference voltage, a second input terminal configured to receive a feedback voltage, the feedback voltage proportional to the DC output voltage and an output terminal configured to provide error current.

7. The DC-DC switching power converter of claim 6, further comprising a current sensor configured to sense a current across at least one of the switches of the switching circuitry, wherein the switching control circuitry further comprises a comparator having a first input terminal configured to receive a first voltage based on the error current, a second input terminal configured to receive a second voltage based on the sensed current and an output terminal configured to provide a switching control signal.

8. The DC-DC switching power converter of claim 7, wherein the switching control circuitry further comprises a switching signal generator having a clock input, an input coupled to the output terminal of the comparator and an output coupled to the switching circuitry.

9. The DC-DC switching power converter of claim 8, wherein the switching signal generator comprises a D flip-flop having a data input configured to be always at a high logic value, wherein the clock input is configured to receive a clock signal oscillating at the switching frequency, wherein the input coupled to the comparator is a reset input configured to receive the switching control signal, and wherein the output is a negated output configured to provide the switching signal.

10. The DC-DC switching power converter of claim 7, wherein the compensation network comprises at least one variable capacitor, wherein the at least one variable capacitor comprises a base capacitor and a set of additional capacitors selectively connectable in parallel to the base capacitor by respective additional switches driven by respective control signals.

11. The DC-DC switching power converter of claim 10, further comprising a logic unit configured to generate the control signals for driving the additional switches based on information about the switching frequency.

12. The DC-DC switching power converter of claim 10, wherein the compensation network is connected to the output terminal of the error amplifier so that the first voltage depends on the error current and on an impedance of the compensation network.

13. The DC-DC switching power converter of claim 7, wherein the switching control signal is equal to a high value when the second voltage is higher than the first voltage and a low value when the second voltage is lower than the first voltage.

14. The DC-DC switching power converter of claim 1, further comprising:
   a current sensor configured to sense a first current across at least one of the switches of the switching circuitry;
   a transconductance amplifier configured to generate a second current depending on the difference between the DC output voltage and the reference voltage; and
   a comparator configured to compare a first voltage depending on the second current with a second voltage depending on the sensed first current to produce a corresponding comparative signal, wherein the switching control circuitry is configured to set the duty cycle of the switching signal based on the comparative signal.

15. The DC-DC switching power converter of claim 14, wherein the compensation network is connected to an output of the transconductance amplifier so that the first voltage depends on the second current and an impedance of the compensation network.

16. The DC-DC switching power converter of claim 1, wherein the switching circuitry comprises a high side switch and a low side switch connected in series between a terminal for the DC input voltage and ground.

17. The DC-DC switching power converter of claim 16, wherein the high side switch is a p-MOS device and the low side switch is an n-MOS device.

18. The DC-DC switching power converter of claim 1, wherein the compensation network is configured to provide the capacitance according to the following rule:
   the higher the switching frequency the lower the capacitance, and
   the lower the switching frequency the higher the capacitance.

19. The DC-DC switching power converter of claim 1, wherein the DC-DC switching power converter is a buck converter.

20. An electronic system comprising a DC-DC switching power converter, the DC-DC switching power converter comprising:
   a switching circuitry comprising switches, the switching circuitry configured to receive a DC input voltage and generate a DC output voltage through switching the switches;
   a switching control circuitry configured to control switching of the switches with a switching signal having a switching frequency with a duty cycle, the DC output voltage generated by the switching circuitry depending on the duty cycle, wherein the switching control circuitry is configured to set the duty cycle based on a difference between the DC output voltage and a reference voltage in a closed loop configuration; and
   a compensation network having a variable capacitance value, wherein the compensation network is configured to provide stability to an operation of the DC-DC switching power converter by adjusting the variable capacitance based on the switching frequency of claim 1.

21. A method for operating a DC-DC switching power converter, the method comprising:
   receiving, by a switching circuitry comprising switches, a DC input voltage;
   generating, by the switching circuitry, a DC output voltage by switching the switches;
   controlling, by a switching control circuitry, the switching of the switches using a switching signal having a switching frequency with a duty cycle, the DC output voltage generated by the switching circuitry depending on the duty cycle, the duty cycle being set based on a difference between the DC output voltage and a reference voltage in a closed loop configuration; and
   providing, by a compensation network, stability to the operating of the DC-DC switching power converter by adjusting the variable capacitance based on the switching frequency.

* * * * *

UNITED STATES PATENT AND TRADEMARK OFFICE
CERTIFICATE OF CORRECTION

| | |
|---|---|
| PATENT NO. | : 11,881,779 B2 |
| APPLICATION NO. | : 17/533042 |
| DATED | : January 23, 2024 |
| INVENTOR(S) | : Nicolosi et al. |

It is certified that error appears in the above-identified patent and that said Letters Patent is hereby corrected as shown below:

In the Claims

In Column 16, in Claim 20, Lines 14-15, delete "frequency of claim 1." and insert -- frequency. --.

Signed and Sealed this
Twenty-third Day of April, 2024

*Katherine Kelly Vidal*

Katherine Kelly Vidal
*Director of the United States Patent and Trademark Office*